(12) United States Patent
Ichida (10) Patent No.: US 10,654,367 B2
(45) Date of Patent: May 19, 2020

(54) VEHICLE

(71) Applicant: TOYOTA JIDOSHA KABUSHIKI KAISHA, Toyota-shi, Aichi-ken (JP)

(72) Inventor: Yugo Ichida, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/956,946

(22) Filed: Apr. 19, 2018

(65) Prior Publication Data

US 2018/0304767 A1 Oct. 25, 2018

(30) Foreign Application Priority Data

Apr. 21, 2017 (JP) ................................. 2017-084239

(51) Int. Cl.
| | |
|---|---|
| *B60K 1/04* | (2019.01) |
| *B60L 11/18* | (2006.01) |
| *F16F 7/12* | (2006.01) |
| *B60L 3/00* | (2019.01) |
| *H01M 8/2465* | (2016.01) |
| *B60L 50/71* | (2019.01) |
| *B60K 1/00* | (2006.01) |

(Continued)

(52) U.S. Cl.
CPC ............ *B60L 11/1896* (2013.01); *B60K 1/00* (2013.01); *B60K 1/04* (2013.01); *B60L 3/0007* (2013.01); *B60L 50/71* (2019.02); *F16F 7/12* (2013.01); *H01M 8/2465* (2013.01); *B60K 2001/0411* (2013.01); *B60L 50/72* (2019.02); *B60R 19/023* (2013.01); *B60Y 2306/01* (2013.01); *B60Y 2400/202* (2013.01); *F16F 2224/02* (2013.01); *F16F 2224/0208* (2013.01); *F16F 2224/0233* (2013.01); *H01M 2250/20* (2013.01); *Y02T 90/32* (2013.01)

(58) Field of Classification Search
CPC .... B60K 2001/0411; B60K 2001/0405; B62D 21/15; B62D 21/152; B62D 21/155
USPC ....................................................... 180/68.5
See application file for complete search history.

(56) References Cited

U.S. PATENT DOCUMENTS 4,174,014 A * 11/1979 Bjorksten ................ B60K 1/04
180/68.5
5,372,216 A * 12/1994 Tsuji ...................... B60G 99/00
180/274

(Continued)

FOREIGN PATENT DOCUMENTS

| DE | 11 2012 001 583 T5 | 2/2014 |
| JP | 2015-231319 | 12/2015 |

(Continued)

*Primary Examiner* — Jeffrey J Restifo
(74) *Attorney, Agent, or Firm* — Finnegan, Henderson, Farabow, Garrett & Dunner, LLP (57) ABSTRACT

A vehicle includes: a front room disposed at a front part of the vehicle in a longitudinal direction of the vehicle; a fuel cell stack disposed in the front room, the fuel cell stack including multiple cells stacked in the longitudinal direction; a bumper reinforcement disposed at a front part of the front room in the longitudinal direction; and a buffer member disposed between the fuel cell stack and the bumper reinforcement in the longitudinal direction. At least a part of the buffer member overlaps with the bumper reinforcement, as viewed from a direction along the longitudinal direction.

8 Claims, 13 Drawing Sheets

(51) Int. Cl.
  *B60R 19/02*  (2006.01)
  *B60L 50/72*  (2019.01)

(56) References Cited

U.S. PATENT DOCUMENTS

| | | | | |
|---|---|---|---|---|
| 5,476,151 A * | 12/1995 | Tsuchida | B60K 1/00 | 180/274 |
| 5,555,950 A * | 9/1996 | Harada | B60K 1/04 | 180/232 |
| 5,740,876 A * | 4/1998 | Shimose | B60K 5/1216 | 180/232 |
| 5,947,223 A * | 9/1999 | Rebmann | B60R 21/00 | 180/232 |
| 6,431,300 B1 * | 8/2002 | Iwase | B60K 1/04 | 180/68.5 |
| 6,722,696 B2 * | 4/2004 | Sonomura | B60K 5/1216 | 180/232 |
| 7,044,246 B2 * | 5/2006 | Fujieda | B60K 11/04 | 180/274 |
| 7,066,515 B2 * | 6/2006 | Pierce | B60R 19/00 | 180/68.5 |
| 7,070,015 B2 * | 7/2006 | Mathews | B60K 1/04 | 180/274 |
| 7,144,039 B2 * | 12/2006 | Kawasaki | B60K 1/04 | 280/784 |
| 7,174,977 B2 * | 2/2007 | Enjoji | B60L 1/003 | 180/53.8 |
| 7,222,692 B2 * | 5/2007 | Masuda | B60K 1/00 | 180/291 |
| 7,484,581 B2 * | 2/2009 | Yamafuji | B60L 3/0007 | 180/220 |
| 7,669,688 B2 * | 3/2010 | Yamaguchi | B62D 21/152 | 180/232 |
| 7,717,207 B2 * | 5/2010 | Watanabe | B60K 1/04 | 180/274 |
| 7,802,643 B2 * | 9/2010 | Yajima | B60K 6/40 | 180/271 |
| 7,802,839 B2 * | 9/2010 | Ajisaka | B60K 1/04 | 296/187.09 |
| 7,836,999 B2 * | 11/2010 | Kato | B62D 21/155 | 180/312 |
| 7,886,861 B2 * | 2/2011 | Nozaki | B60K 1/00 | 180/232 |
| 8,037,960 B2 * | 10/2011 | Kiya | B60K 1/04 | 180/68.5 |
| 8,051,934 B2 * | 11/2011 | Kiya | B60K 1/04 | 180/274 |
| 8,276,698 B2 * | 10/2012 | Guss | B60K 1/04 | 180/65.1 |
| 8,356,687 B2 * | 1/2013 | Baumann | B60R 21/0134 | 180/232 |
| 8,616,319 B2 * | 12/2013 | Yokoyama | B60K 1/04 | 180/68.5 |
| 8,657,365 B2 * | 2/2014 | Amano | B60K 1/00 | 296/187.11 |
| 8,708,402 B2 * | 4/2014 | Saeki | B60K 1/04 | 180/68.5 |
| 8,733,485 B2 * | 5/2014 | Hilmann | B62D 21/152 | 180/68.4 |
| 8,839,895 B2 * | 9/2014 | Kato | B60K 1/04 | 180/68.5 |
| 8,851,223 B2 * | 10/2014 | Yamashita | B62D 21/155 | 180/291 |
| 8,863,877 B2 * | 10/2014 | Saeki | B60K 1/04 | 180/271 |
| 8,863,878 B2 * | 10/2014 | Shirooka | B60K 1/04 | 180/68.5 |
| 9,079,508 B2 * | 7/2015 | Naito | B60K 1/04 | |
| 9,260,034 B2 * | 2/2016 | Naito | B60L 3/0007 | |
| 9,371,009 B2 * | 6/2016 | Ishikawa | B62D 21/15 | |
| 9,469,201 B2 * | 10/2016 | Hotta | B60K 1/04 | |
| 9,539,897 B2 * | 1/2017 | Yoshinaga | B60L 11/1898 | |
| 9,561,824 B2 * | 2/2017 | Tamaoki | B62D 21/152 | |
| 9,586,499 B2 * | 3/2017 | Fushimi | B60K 1/00 | |
| 9,711,819 B2 * | 7/2017 | Ishikawa | B60L 11/1896 | |
| 9,855,914 B1 * | 1/2018 | Hammer | B60R 19/023 | |
| 9,895,999 B2 * | 2/2018 | Ohashi | B60K 1/04 | |
| 9,937,781 B1 * | 4/2018 | Bryer | B60K 1/04 | |
| 9,941,495 B2 * | 4/2018 | Naito | H01M 2/1083 | |
| 9,963,028 B1 * | 5/2018 | Pachore | B60K 1/04 | |
| 9,963,170 B2 * | 5/2018 | Haga | B62D 21/152 | |
| 9,963,171 B2 * | 5/2018 | Nagaosa | H01M 8/04201 | |
| 9,975,416 B2 * | 5/2018 | Hara | B62D 25/2027 | |
| 9,981,541 B2 * | 5/2018 | Onodera | B60K 1/04 | |
| 9,981,693 B2 * | 5/2018 | Murata | B60K 1/04 | |
| 10,005,350 B1 * | 6/2018 | Khan | B60K 1/04 | |
| 2003/0070858 A1 | 4/2003 | Kondo | | |
| 2004/0159478 A1 * | 8/2004 | Masuda | B60K 1/00 | 180/65.22 |
| 2007/0051549 A1 * | 3/2007 | Fukuda | B60K 1/00 | 180/232 |
| 2009/0026802 A1 * | 1/2009 | Imada | B62D 21/152 | 296/187.11 |
| 2013/0341114 A1 | 12/2013 | Ozawa et al. | | |
| 2014/0367182 A1 | 12/2014 | Yoshinaga et al. | | |
| 2015/0027796 A1 | 1/2015 | Naito et al. | | |
| 2017/0096172 A1 | 4/2017 | Nagaosa | | |

FOREIGN PATENT DOCUMENTS

| | | |
|---|---|---|
| WO | WO 2013/111669 A1 | 8/2013 |
| WO | WO 2013/118602 A1 | 8/2013 |

* cited by examiner

VEHICLE

INCORPORATION BY REFERENCE

The disclosure of Japanese Patent Application No. 2017-084239 filed on Apr. 21, 2017 including the specification, drawings and abstract is incorporated herein by reference in its entirety.

BACKGROUND

1. Technical Field

The present disclosure relates to a vehicle.

2. Description of Related Art

A vehicle may include a fuel cell stack that is a stack of fuel cells. A fuel cell stack is sometimes installed in a front room located in a front part of a vehicle, as described in International Publication No. WO 2013/118602, for example. In the vehicle described in WO 2013/118602 A, a buffer member (an impact mitigating mechanism) to protect the fuel cell stack is also disposed in the front room.

SUMMARY

Unfortunately, with the arrangement of the buffer member described in WO 2013/118602 A, at the time of a collision of the vehicle toward a vehicle frontward direction (hereinafter, a collision caused from the vehicle frontward direction is referred to as a "front collision"), the buffer member does not securely hit a bumper reinforcement of the vehicle in some cases. In this case, the buffer member does not properly absorb an impact, so that the impact might be applied onto the fuel cell stack. For this reason, there is still room for improvement in light of reduction of an impact onto a fuel cell stack in a front collision.

The present disclosure provides a technique more capable of reducing an impact onto a fuel cell stack in a front collision.

An aspect of the disclosure provides a vehicle including: a front room disposed at a front part of the vehicle in a longitudinal direction of the vehicle; a fuel cell stack disposed in the front room, the fuel cell stack including multiple cells stacked in the longitudinal direction; a bumper reinforcement disposed at a front part of the front room in the longitudinal direction; and a buffer member disposed between the fuel cell stack and the bumper reinforcement in the longitudinal direction. At least a part of the buffer member overlaps with the bumper reinforcement, as viewed from a direction along the longitudinal direction.

According to the above aspect, in a front collision of the vehicle, the buffer member can be securely brought to hit the bumper reinforcement, to thus absorb the impact of the front collision by the buffer member. Accordingly, in a front collision, the impact onto the fuel cell stack can be reduced.

In the above aspect, the fuel cell vehicle may further include an auxiliary-device component disposed between the bumper reinforcement and the buffer member. The buffer member may include a first buffer portion and a second buffer portion having a lower durable load in the longitudinal direction than a durable load of the first buffer portion in the longitudinal direction. The first buffer portion and the second buffer portion may be arranged adjacent to each other, and the first buffer portion may be disposed within a range corresponding to an outline of the bumper reinforcement, as viewed from the direction along the longitudinal direction.

According to the above configuration, in a front collision of the vehicle, because the first buffer portion can be more securely brought to hit the bumper reinforcement, thus it is possible to more securely absorb the impact of the front collision by the buffer member. Accordingly, in a front collision, it is possible to more securely reduce the impact onto the fuel cell stack.

In the above aspect, the first buffer portion and the second buffer portion may be arranged adjacent to each other in a height direction of the vehicle.

According to the above aspect, for example, if the auxiliary-device component is disposed at a higher position than the bumper reinforcement, in a front collision of the vehicle, the first buffer portion having a higher durable load can be brought to hit the bumper reinforcement while the second buffer portion having a lower durable load is brought to hit the auxiliary-device component, thus suppressing the auxiliary-device component from falling down over the bumper reinforcement. Accordingly, in a front collision, it is possible to more securely reduce the impact onto the fuel cell stack.

In the above aspect, at least a part of the second buffer portion may overlap with the auxiliary-device component, as viewed from the direction along the longitudinal direction.

According to the above aspect, in a front collision of the vehicle, the first buffer portion having a higher durable load can be brought to hit the bumper reinforcement while the second buffer portion having a lower durable load is securely brought to hit the auxiliary-device component, thus more securely absorbing the impact of the front collision by the buffer member. Accordingly, in a front collision, it is possible to more securely reduce the impact onto the fuel cell stack.

In the above aspect, the auxiliary-device component may have a higher durable load in the longitudinal direction than a durable load of the bumper reinforcement in the longitudinal direction.

According to the above aspect, the buffer member can be brought to hit the bumper reinforcement via the auxiliary-device component having a higher durable load in a front collision of the vehicle. Accordingly it is possible to more securely absorb the impact of the front collision by the buffer member.

In the above aspect, the fuel cell stack may include a stack frame supporting the fuel cell stack, a part of the buffer member may be fixed to the stack frame, and another part of the buffer member that is not fixed to the stack frame may be fixed to a support member protruding from the stack frame.

According to the above aspect, the part of the buffer member that is not fixed to the stack frame can be supported by the support member, thus more securely absorbing the impact of the front collision by the buffer member in a front collision of the vehicle. Accordingly, in a front collision, it is possible to more securely reduce the impact onto the fuel cell stack.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
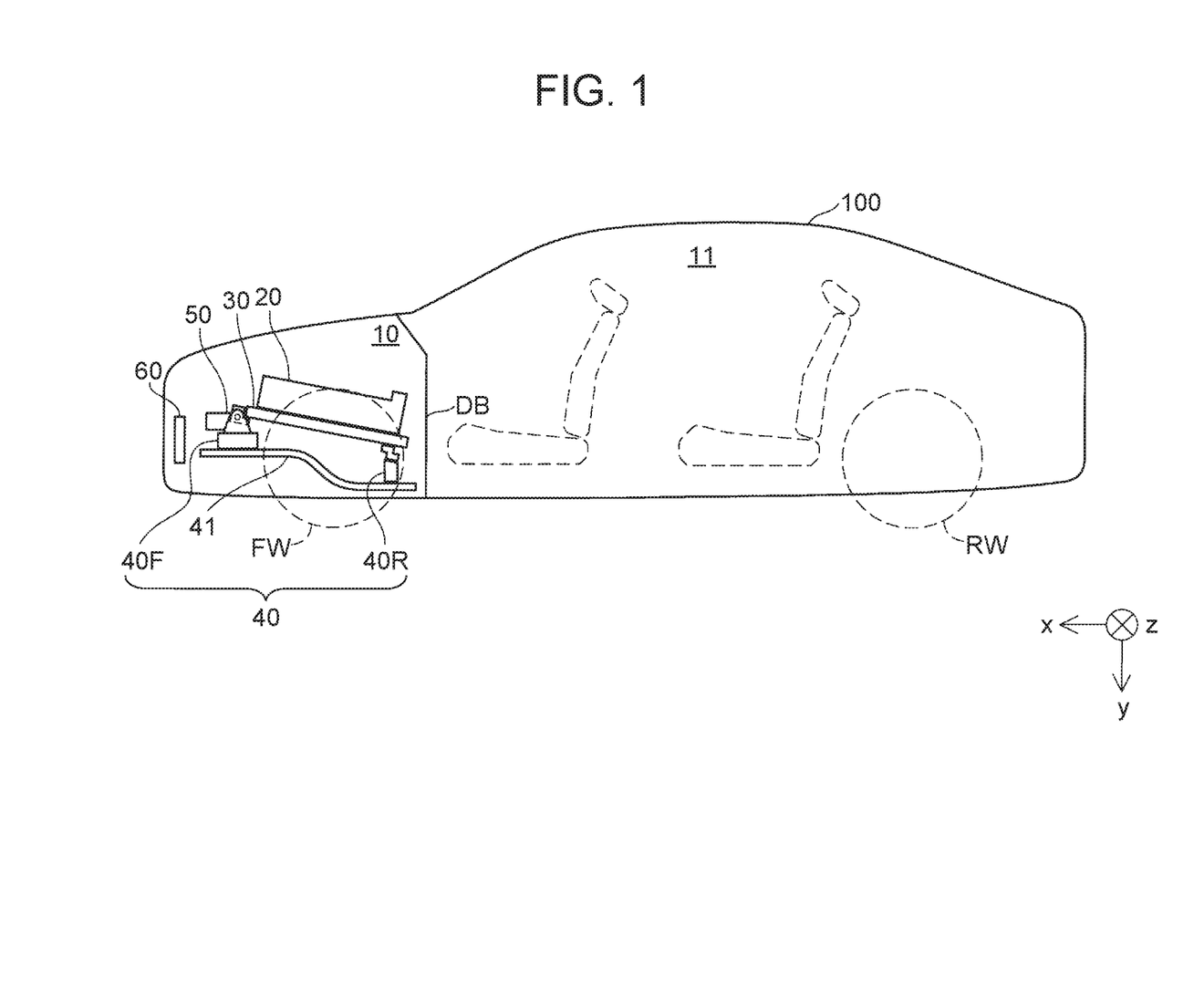
FIG. 1 is an explanatory view showing a schematic configuration of a fuel cell vehicle.

FIG. 1 is an explanatory view showing a schematic configuration of a vehicle 100 having a fuel cell stack (hereinafter, also referred to as "fuel cell vehicle 100") in one embodiment of the present disclosure. The fuel cell vehicle 100 includes a front room 10 and a vehicle cabin 11. In the present embodiment, the front room 10 is formed as a space that includes a region interposed between a pair of front wheels FW, and is located at a more frontward position (in a +x-axis direction) than the vehicle cabin 11 of the fuel cell vehicle 100. The front room 10 and the vehicle cabin 11 are partitioned by a dash board DB. The fuel cell vehicle 100 includes a fuel cell stack 20 as an electric power source, and a motor (not illustrated) as a motive power source to drive at least either of the front wheels FW and rear wheels RW. FIG. 1 shows an x-axis, a y-axis, and a z-axis that are orthogonal to one another. The axes correspond to respective axes shown in FIG. 2 and the subsequent drawings.

The fuel cell stack 20, a buffer member 50, and a bumper reinforcement 60 are disposed in the front room 10. The vehicle cabin 11 is formed at a more vehicle-rearward position (in a −x-axis direction) than the front room 10. In the present embodiment, the vehicle cabin 11 is formed as a space located between the pair of front wheels FW and the pair of rear wheels RW, the space expanding in the vehicle-longitudinal direction (the x-axis direction).

The fuel cell stack 20 is a proton-exchange membrane fuel cell, and generates electric power by receiving hydrogen gas supply from a hydrogen gas supply system (not illustrated), and air supply from an air supply system (not illustrated). The fuel cell stack 20 is formed by stacking multiple cells (not illustrated) in the longitudinal direction (the x-axis direction) of the fuel cell vehicle 100.

In the present embodiment, the fuel cell stack 20 is fixed to a suspension member 41 via a stack frame 30, and is disposed inside the front room 10. The stack frame 30 is a metallic member supporting the fuel cell stack 20 from a bottom thereof. The stack frame 30 is fixed to the suspension member 41 by mounts 40 provided respectively to a front end (in the +x-axis direction) and to a rear end (in the −x-axis direction) of a lower part (in a +y-axis direction) of the stack frame 30. The mounts 40 include a front mount 40F located at the front end position of the stack frame 30, and a rear mount 40R located at the rear end position of the stack frame 30.

The suspension member 41 is a member composing a part of vehicle body frames of the fuel cell vehicle 100, and in the present embodiment, the suspension member 41 is also used as a member supporting the fuel cell stack 20. In the present embodiment, the "fuel cell stack" also includes a case thereof and the stack frame 30.

In the present embodiment, the buffer member 50 is disposed frontward of the stack frame 30, in other words, in front of the fuel cell stack 20. In addition, the bumper reinforcement 60 is disposed to extend along the vehicle-width direction at a frontward position in the fuel cell vehicle 100, more specifically, in front of the buffer member 50. The bumper reinforcement 60 is a member having a higher durable load in the longitudinal direction of the fuel cell vehicle 100 than that of the buffer member 50. In the following description, the durable load denotes a durable load in the longitudinal direction of the fuel cell vehicle 100.

Figure 2:
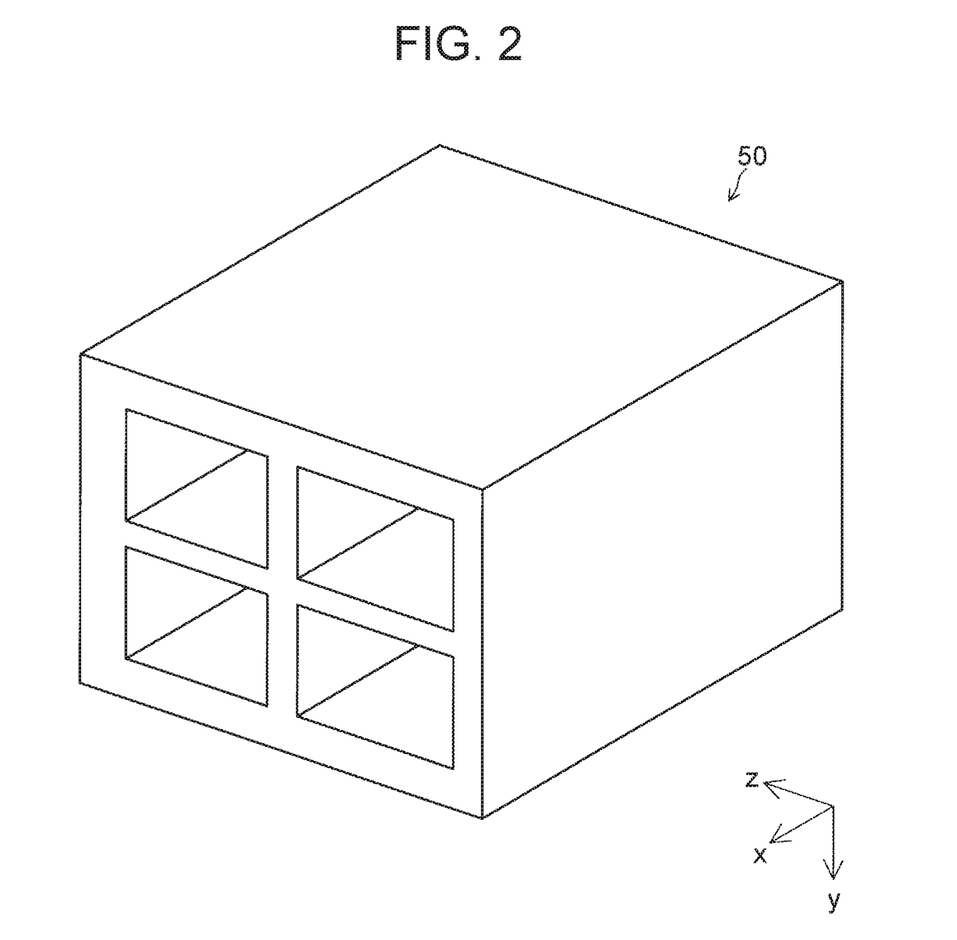
FIG. 2 is an explanatory view showing a schematic configuration of a buffer member.

FIG. 2 is an explanatory view showing a schematic configuration of the buffer member 50. In the present embodiment, as the buffer member 50, a crush box formed by extruding an aluminum alloy is used. As the buffer member 50, for example, a buffer member made of metal other than an aluminum alloy, or resin may also be used.

When a load is applied to the buffer member 50 in the axial direction (the x-axis direction) thereof at the time of a front collision of the fuel cell vehicle 100, the buffer member 50 repetitively buckles in the axial direction, to be plastically deformed into a bellows shape (in an accordion-like shape) so as to absorb the collision load. The buffer member 50 has a smaller durable load than those of the stack frame 30 and the bumper reinforcement 60.

Figure 3:
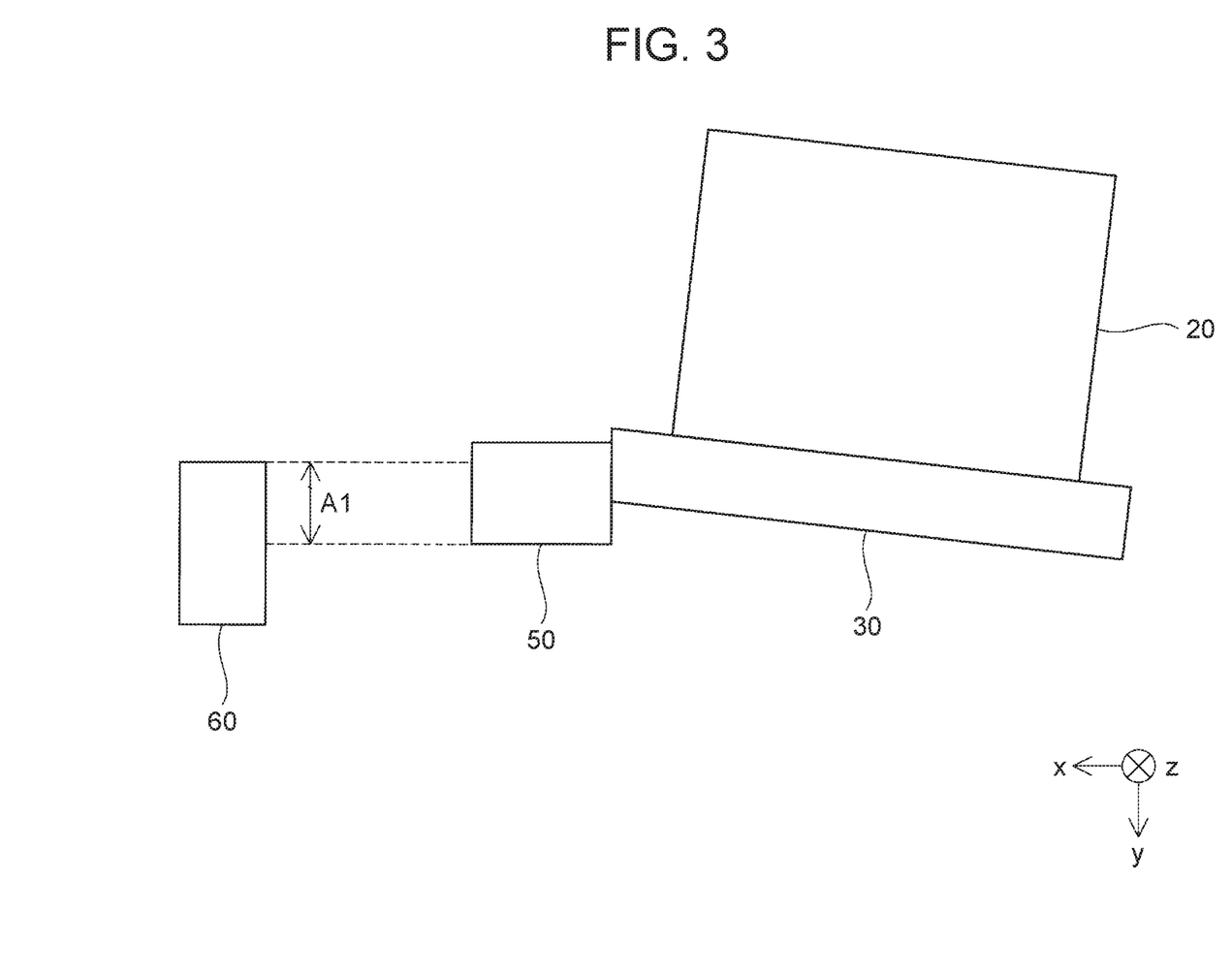
FIG. 3 is an explanatory view showing an arrangement of the buffer member.

FIG. 3 is an explanatory view showing an arrangement of the buffer member 50. As shown in FIG. 3, the buffer member 50 is fixed to a front end of the stack frame 30. As viewed from the direction along the longitudinal direction (the x-axis direction) of the fuel cell vehicle 100, the buffer member 50 is so disposed as to at least partially overlap with the bumper reinforcement 60. FIG. 3 shows an overlapping range A1 which is indicated by broken lines. In the present embodiment, an upper end of the bumper reinforcement 60 is located at a lower level than an upper end of the buffer member 50, A lower end of the bumper reinforcement 60 is located at a lower level than a lower end of the buffer member 50.

According to the above-described fuel cell vehicle 100 of the present embodiment, the buffer member 50 is disposed such that at least a part of the buffer member 50 overlaps with the bumper reinforcement 60 in the longitudinal direction of the fuel cell vehicle 100; thus, it is possible to securely bring the buffer member 50 to hit the bumper reinforcement 60 in a front collision of the fuel cell vehicle 100. Therefore, it is possible to absorb an impact of the front collision by the buffer member 50. Accordingly, in a front collision, it is possible to reduce the impact onto the fuel cell stack 20.

Second Embodiment

Figure 4:
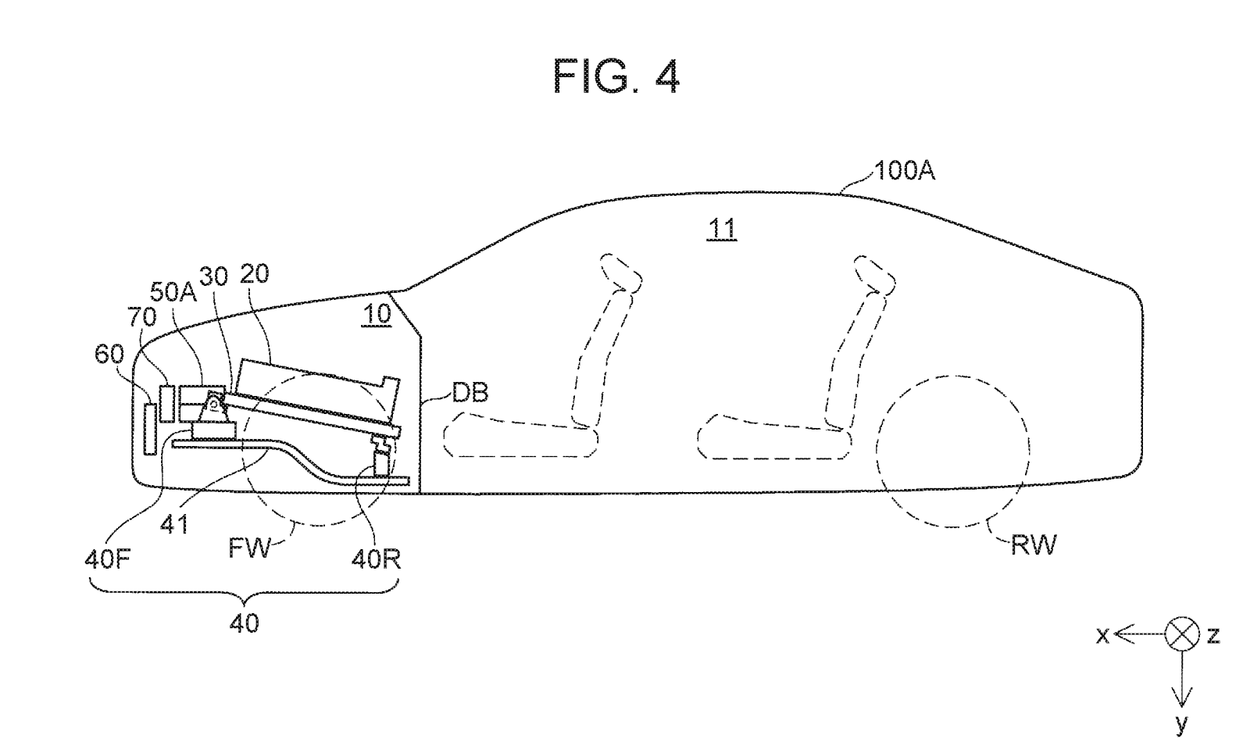
FIG. 4 is an explanatory view showing a schematic configuration of a fuel cell vehicle in a second embodiment.

FIG. 4 is an explanatory view showing a schematic configuration of a vehicle 100A having a fuel cell stack (hereinafter, referred to as "fuel cell vehicle 100A") in the second embodiment. In the description of the second embodiment, the same reference numerals are added to the same configurations as those of the first embodiment, and description thereof will be omitted. In the present embodiment, the fuel cell vehicle 100A includes an auxiliary-device component 70 between the bumper reinforcement 60 and a buffer member 50A in the longitudinal direction (the x-axis direction) of the fuel cell vehicle 100A.

The auxiliary-device component 70 is an auxiliary-device component having a higher durable load than those of the buffer member 50A and the bumper reinforcement 60. In the present embodiment, the auxiliary-device component 70 is a fan motor for cooling a radiator. The auxiliary-device component 70 is not limited to the fan motor, but for example, may be a water pump for supplying a coolant to the radiator, or the like. The "auxiliary-device component" in the present embodiment may include a device for allowing the fuel cell stack 20 to generate electric power, and a device for driving the fuel cell vehicle 100A. In other embodiments, the auxiliary-device component 70 may have a durable load equal to or less than those of the buffer member 50A and the bumper reinforcement 60.

Figure 5:
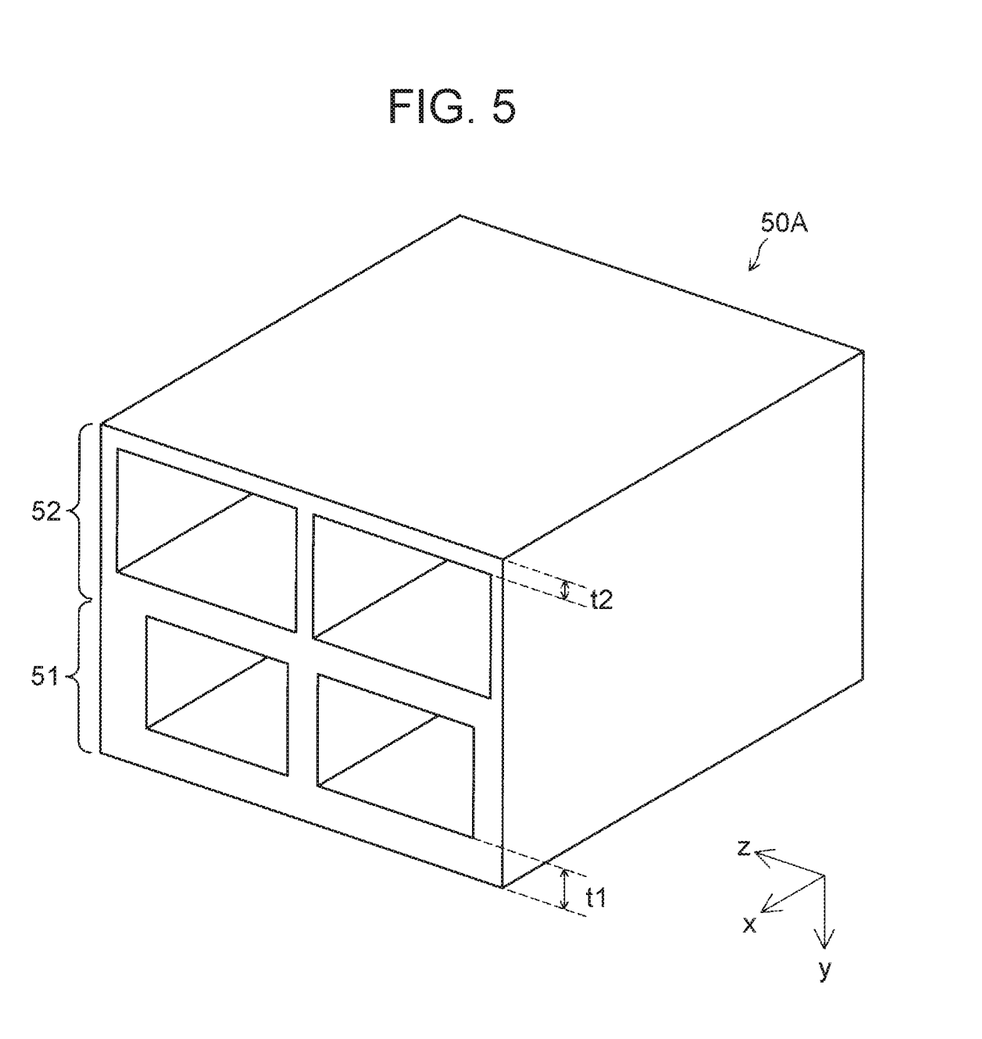
FIG. 5 is an explanatory view showing a schematic configuration of a buffer member in the second embodiment.

FIG. 5 is an explanatory view showing a schematic configuration of the buffer member 50A in the second embodiment. In the present embodiment, the buffer member 50A includes a first buffer portion 51 and a second buffer portion 52. The first buffer portion 51 and the second buffer portion 52 are arranged adjacent to each other in the height direction (the y-axis direction) of the fuel cell vehicle 100A. As shown in FIG. 5, in the present embodiment, a plate thickness t2 of the second buffer portion 52 is thinner than a plate thickness t1 of the first buffer portion 51. Thus, the second buffer portion 52 has a lower durable load than that of the first buffer portion 51. In the present embodiment, the first buffer portion 51 and the second buffer portion 52 are adjacent to each other in the height direction of the fuel cell vehicle 100A, but may be disposed adjacent to each other in the width direction of the fuel cell vehicle 100A, or in other directions thereof. Further, the first buffer portion 51 and the second buffer portion 52 may be disposed to be apart from each other.

Figure 6:
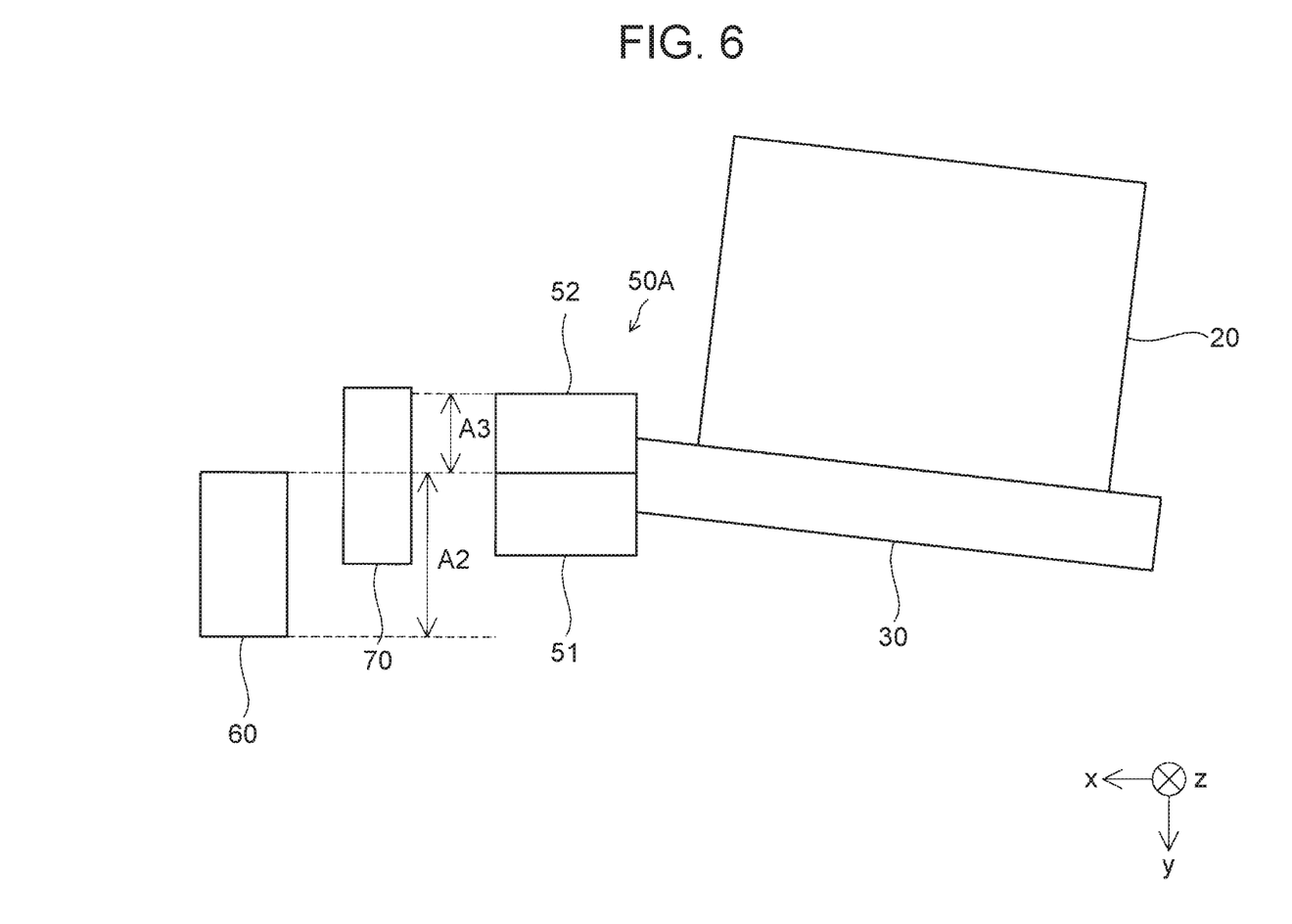
FIG. 6 is an explanatory view showing an arrangement of the buffer member in the second embodiment.

FIG. 6 is an explanatory view showing an arrangement of the buffer member 50A in the second embodiment. As shown in FIG. 6, the buffer member 50A is fixed to a front end of the stack frame 30. The first buffer portion 51 is disposed within a range corresponding to an outline of the bumper reinforcement 60, as viewed from the direction along the longitudinal direction (the x-axis direction) of the fuel cell vehicle 100A.

In FIG. 6, a range A2 corresponding to the outline of the bumper reinforcement 60 is indicated by broken lines. The second buffer portion 52 is so disposed as to at least partially overlap with the auxiliary-device component 70, as viewed from the direction along the longitudinal direction. In FIG. 6, an overlapping range A3 is indicated by broken lines. In the present embodiment, an upper end of the auxiliary-device component 70 is located at a higher level than an upper end of the second buffer portion 52. A lower end of the auxiliary-device component 70 is located at a lower level than a lower end of the second buffer portion 52.

According to the above-described fuel cell vehicle 100A of the present embodiment, the first buffer portion 51 is disposed within the range corresponding to the outline of the bumper reinforcement 60, as viewed from the direction along the longitudinal direction. Therefore, the first buffer portion 51 can be more securely brought to hit the bumper reinforcement 60. Accordingly, it is possible to more securely absorb the impact of the front collision by the buffer member 50A, and it is possible to more securely reduce the impact onto the fuel cell stack 20 in a front collision.

Furthermore, in the present embodiment, the first buffer portion 51 and the second buffer portion 52 are arranged adjacent to each other in the height direction. Therefore, even if the auxiliary-device component 70 is located at a higher position than the bumper reinforcement 60, in a front collision of the fuel cell vehicle 100A, it is possible to bring the first buffer portion 51 having a higher durable load to hit the bumper reinforcement 60 while the second buffer portion 52 having a lower durable load is brought to hit the auxiliary-device component 70. Accordingly, it is possible to suppress the auxiliary-device component 70 from falling down over the bumper reinforcement 60, and thus it is possible to more securely reduce the impact onto the fuel cell stack 20 in a front collision.

In addition, in the present embodiment, the second buffer portion 52 is disposed such that at least a part of the second buffer portion 52 overlaps with the auxiliary-device component 70, as viewed from the direction along the longitudinal direction. Hence, in a front collision of the fuel cell vehicle 100A, it is possible to bring the first buffer portion 51 having a higher durable load to hit the bumper reinforcement 60 while the second buffer portion 52 having a lower durable load is securely brought to hit the auxiliary-device component 70. Accordingly, it is possible to more securely absorb the impact of the front collision by the buffer member 50A, so that it is possible to more securely reduce the impact onto the fuel cell stack 20 in a front collision.

In the present embodiment, it is possible to bring the buffer member 50A to hit the bumper reinforcement 60 in a front collision of the fuel cell vehicle 100A via the auxiliary-device component 70 having a higher durable load. Accordingly, it is possible to more securely absorb the impact of the front collision by the buffer member 50A, and thus it is possible to more securely reduce the impact onto the fuel cell stack 20 in a front collision.

Figure 7:
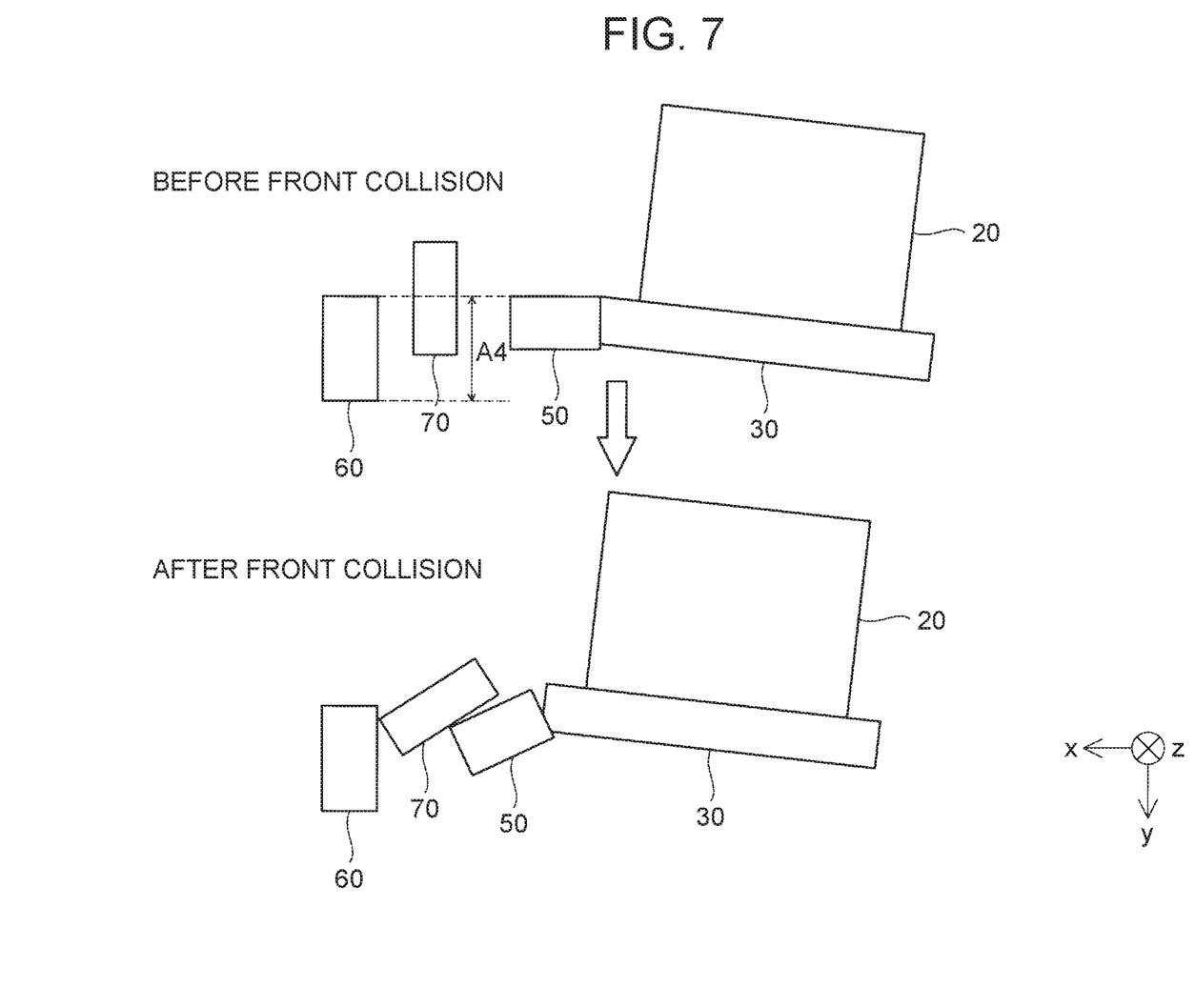
FIG. 7 is a view showing a configuration and an arrangement of the buffer member in a first comparative example.

FIG. 7 is a view showing a configuration and an arrangement of the buffer member 50 in the first comparative example. The buffer member 50 in the first comparative example has the same configuration as that of the buffer member 50 in the first embodiment. As shown in the upper drawing of FIG. 7, in the comparative example, the buffer member 50 is fixed to the front end of the stack frame 30. The buffer member 50 is disposed within a range corresponding to the outline of the bumper reinforcement 60, as viewed from the direction along the longitudinal direction (the x-axis direction) of the fuel cell vehicle 100. In FIG. 7, a range A4 corresponding to the outline of the bumper reinforcement 60 is indicated by broken lines. In the present comparative example, the upper end of the buffer member 50 and the upper end of the bumper reinforcement 60 are located at the same level. In addition, the upper end of the auxiliary-device component 70 is located at a higher level than the upper end of the buffer member 50 and the upper end of the bumper reinforcement 60.

The lower drawing of FIG. 7 shows a state of the buffer member 50 in a front collision of the fuel cell vehicle 100. As shown in the lower drawing of FIG. 7, in the arrangement of the buffer member 50 shown in the upper drawing of FIG. 7, the buffer member 50 is disposed at a lower position than the center in the height direction of the auxiliary-device component 70, and thus the auxiliary-device component 70 might run over the top of the buffer member 50 in a front collision. Consequently, with the configuration and the arrangement of the buffer member 50 of the first comparative example, the buffer member 50 might not be able to absorb the impact in a front collision.

Figure 8:
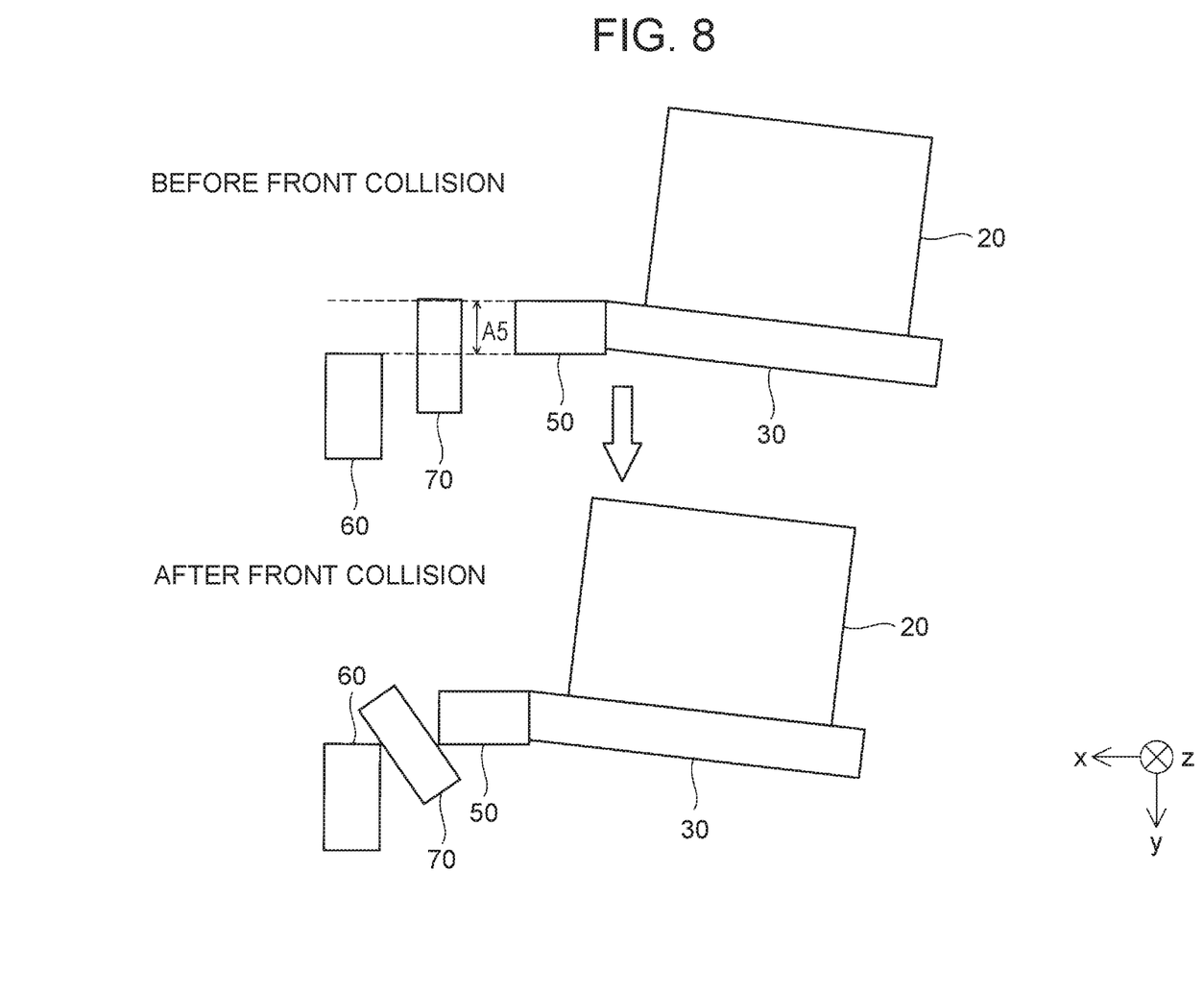
FIG. 8 is a view showing a configuration and an arrangement of a buffer member in a second comparative example.

FIG. 8 is a view showing a configuration and an arrangement of the buffer member 50 in the second comparative example. The buffer member 50 has the same configuration and arrangement as those of the first comparative example. The buffer member 50 is so disposed as to at least partially overlap with the auxiliary-device component 70, as viewed from the direction along the longitudinal direction (the x-axis direction) of the fuel cell vehicle 100. In FIG. 8, an overlapping range A5 is indicated by broken lines. Note that in the second comparative example, the lower end of the buffer member 50 is located at the same level as that of the upper end of the bumper reinforcement 60. In other words, the buffer member 50 is disposed such that the buffer member 50 does not overlap with the bumper reinforcement 60, as viewed from the direction along the longitudinal direction.

The lower drawing of FIG. 8 shows a state of the buffer member 50 in a front collision of the fuel cell vehicle 100. As shown in the lower drawing of FIG. 8, in the arrangement of the buffer member 50 shown in the upper drawing of FIG. 8, the center in the height direction of the buffer member 50 is located at a higher position than the bumper reinforcement 60, and thus the auxiliary-device component 70 might fall down on the bumper reinforcement 60 in a front collision. Consequently, with the configuration and the arrangement of the buffer member 50 of the second comparative example, the buffer member 50 might not be able to absorb the impact in a front collision.

Contrary to the comparative example, in the fuel cell vehicle 100A of the present embodiment, as shown in FIG. 6, the upper end of the bumper reinforcement 60 is located at the same level as that of the boundary between the first buffer portion 51 and the second buffer portion 52, in other words, as that of the upper end of the first buffer portion 51. In addition, the lower end of the auxiliary-device component 70 is located between the upper end and the lower end of the bumper reinforcement 60. Hence, according to the present embodiment, at the time of the front collision of the fuel cell vehicle 100A, it is possible to bring the buffer member 50A to hit the bumper reinforcement 60 while preventing the auxiliary-device component 70 from falling down. As a result, it is possible to more securely absorb the impact of the front collision by the buffer member 50A, to thus more securely reduce the impact onto the fuel cell stack 20 in a front collision.

Third Embodiment

Figure 9:
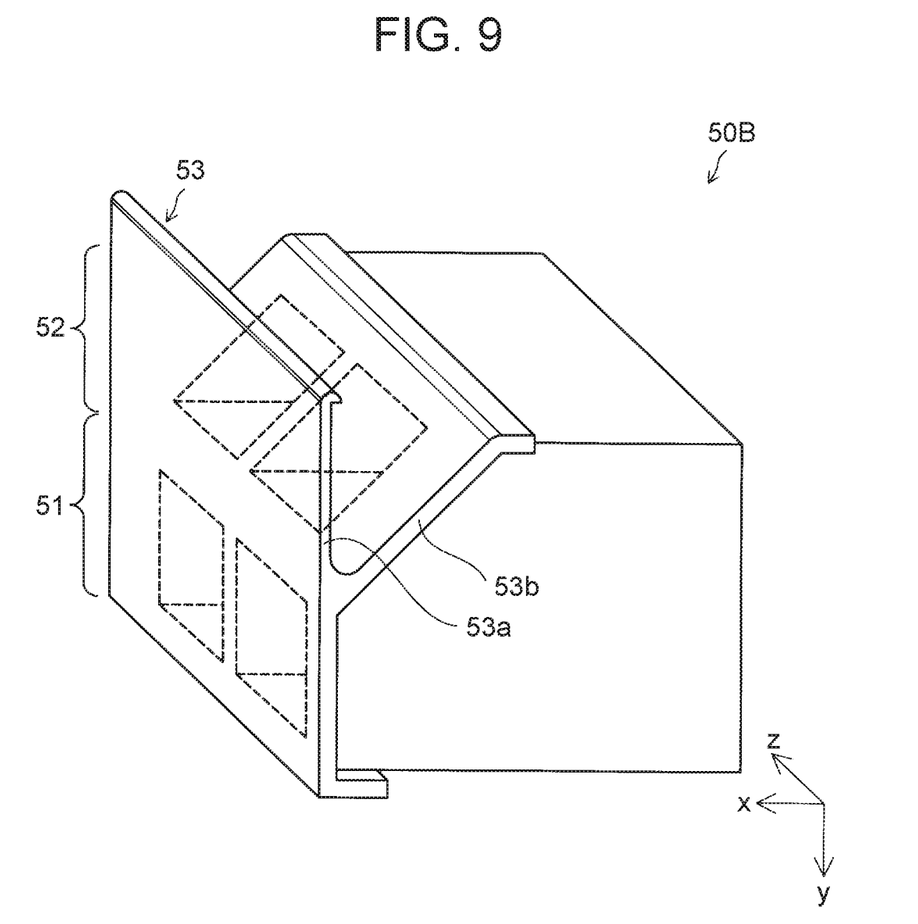
FIG. 9 is an explanatory view showing a schematic configuration of a buffer member in a third embodiment.

FIG. 9 is an explanatory view showing a schematic configuration of a buffer member 50B in the third embodiment. In the description of the third embodiment, the same reference numerals are added to the same configurations as those of the second embodiment, and description thereof will be omitted. As shown in FIG. 9, in the present embodiment, the second buffer portion 52 has a front portion (in the +x-axis direction) obliquely cut off. Hence, the second buffer portion 52 has a lower durable load in the longitudinal direction of the fuel cell vehicle 100A than that of the first buffer portion 51.

The buffer member 50B has a front cover 53 at a front end surface thereof. The front cover 53 includes a portion covering a front end surface of the first buffer portion 51, a plate-like portion 53a extending upward from an upper end of the front end surface of the first buffer portion 51, and an inclined portion 53b obliquely extending along an inclined front end surface of the second buffer portion 52. In the present embodiment, the front cover 53 is formed by an aluminum alloy. The front cover 53 may also be formed by metal other than an aluminum alloy, resin, or the like, for example. An internal structure of the buffer member 50B is the same as that of the buffer member 50 in the first embodiment shown in FIG. 2.

With the above-described buffer member 50B, in a front collision of the fuel cell vehicle 100A, it is also possible to bring the first buffer portion 51 having a higher durable load to hit the bumper reinforcement 60 while the second buffer portion 52 having a lower durable load is securely brought to hit the auxiliary-device component 70. Accordingly, the same effect as that of the second embodiment can be attained.

Figure 10:
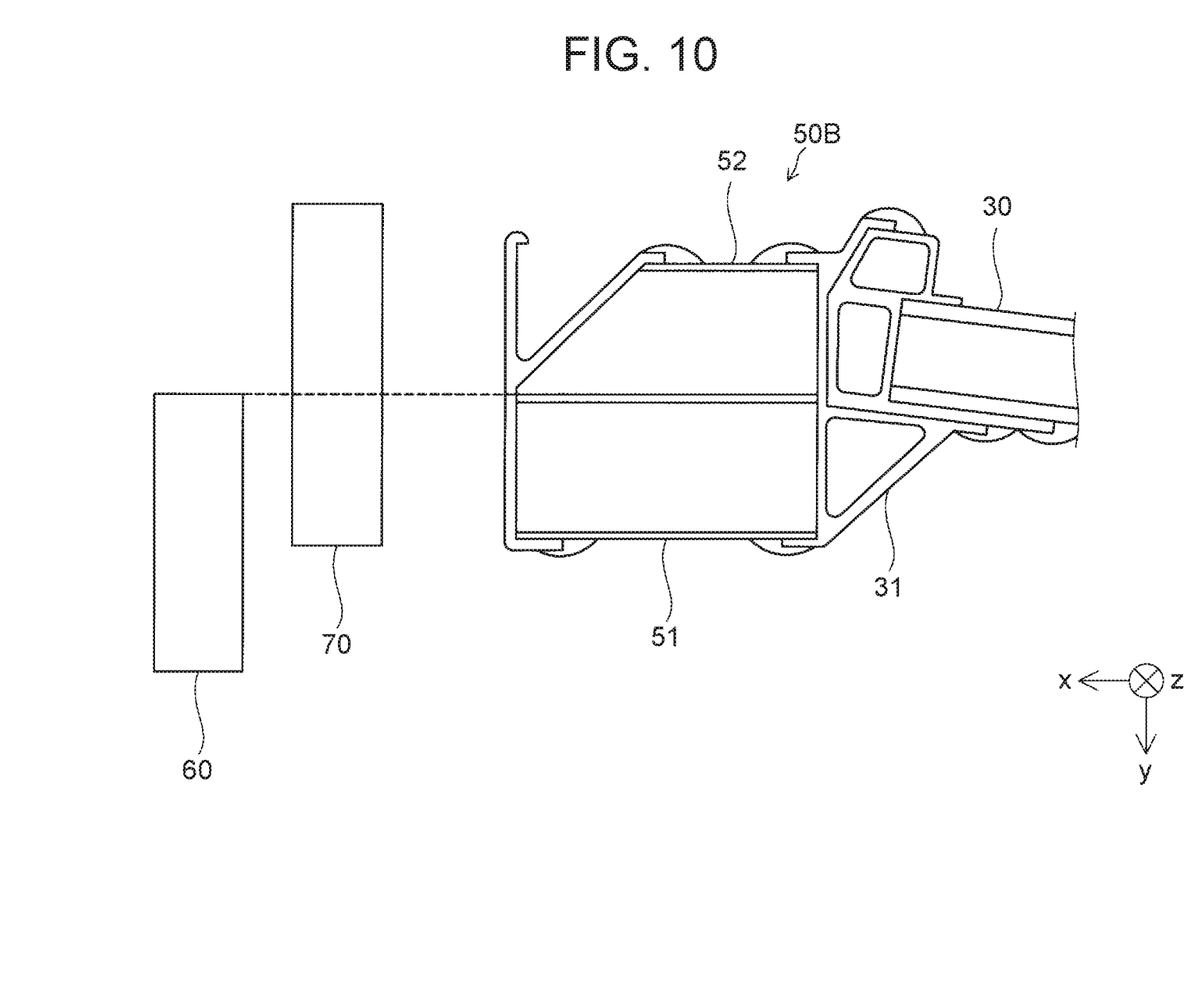
FIG. 10 is an explanatory view showing an arrangement of the buffer member in the third embodiment.

FIG. 10 is an explanatory view showing an arrangement of the buffer member 50B in the third embodiment. As shown in FIG. 10, the second buffer portion 52 is fixed to the front end of the stack frame 30. In the meantime, the first buffer portion 51 is fixed to a support member 31 protruding downward from the stack frame 30. In other words, a part of the buffer member 50B is fixed to the stack frame 30, another part of the buffer member 50B that is not fixed to the stack frame 30 is fixed to the support member 31.

The support member 31 is a member so welded as to protrude from the stack frame 30 in the height direction of the fuel cell vehicle 100A. In the present embodiment, the support member 31 is formed by an aluminum alloy. The support member 31 may be formed by metal other than an aluminum alloy, resin, or the like, for example. The support member 31 may be fixed to the stack frame 30 by not welding but bolts and others.

According to the above-described fuel cell vehicle 100A of the present embodiment, because the stack frame 30 can support the first buffer portion 51 by the support member 31, in a front collision of the fuel cell vehicle 100A, it is possible to more securely absorb the impact by the buffer member 50B. Accordingly, in a front collision, it is possible to more securely reduce the impact onto the fuel cell stack 20.

Variation:
<First Variation>

In the above embodiments, each of the buffer members 50, 50A, 50B may be composed by a container containing a gel having an impact absorbing property, for example. Each of the buffer members 50, 50A, 50B may also be formed by a rubber plate or a spring.

<Second Variation>

In the above embodiments, each of the buffer members 50, 50A is fixed to the front end of the stack frame 30. On the contrary, each of the buffer members 50, 50A may be fixed to a frontward position (in the +x-axis direction) of the fuel cell stack 20.

<Third Variation>

In the above second and the above third embodiments, the second buffer portion 52 is so disposed as to at least partially overlap with the auxiliary-device component 70, as viewed from the direction along the longitudinal direction of the fuel cell vehicle 100A. On the contrary, the second buffer portion 52 may be disposed not to overlap with the auxiliary-device component 70.

<Fourth Variation>

Figure 11:
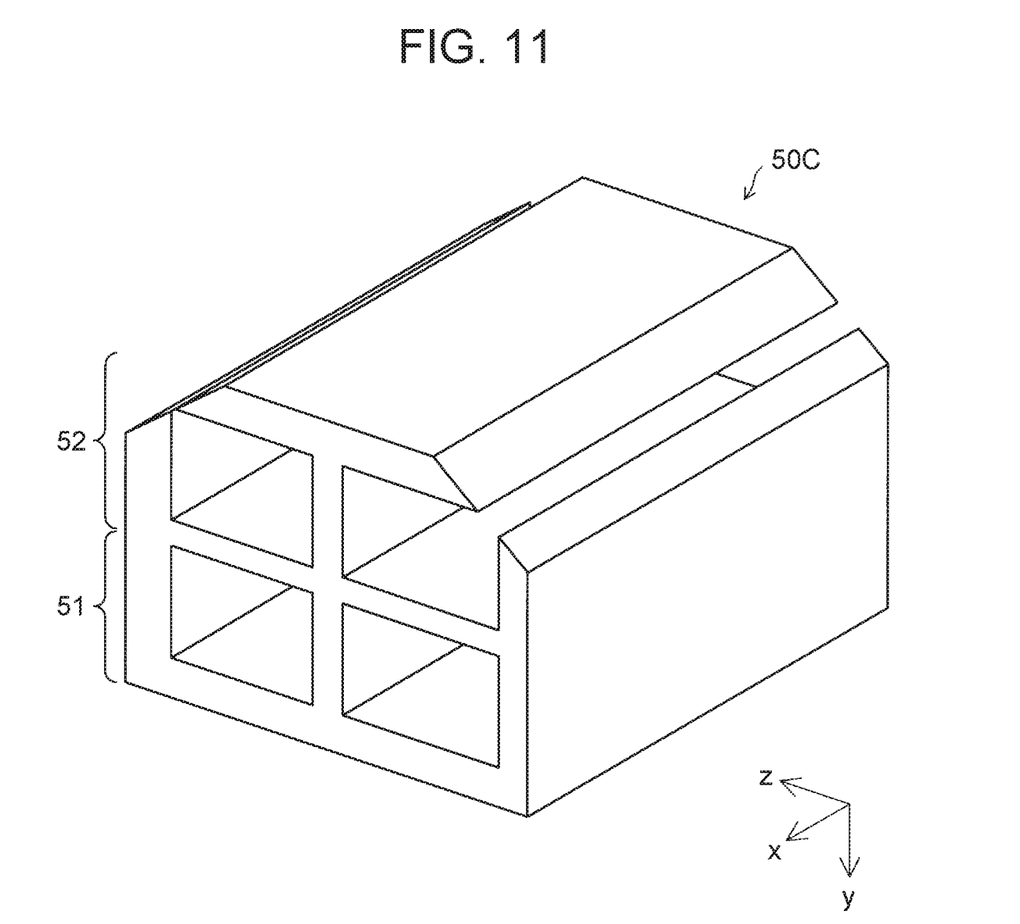
FIG. 11 is an explanatory view showing a schematic configuration of a buffer member in a fourth variation.

FIG. 11 is an explanatory view showing a schematic configuration of a buffer member 50C in the fourth variation. As shown in FIG. 11, in the above second embodiment and the above third embodiment, in the buffer member 50C, a part of an upper part (in the +y-axis direction) of the second buffer portion 52 may be cut off. In a front collision of the fuel cell vehicle 100A, a load to be applied when the corner is crushed becomes maximum in the buffer member 50C. Hence, by cutting off the corner of the second buffer portion 52, the durable load of the second buffer portion 52 becomes lower than that of the first buffer portion 51.

<Fifth Variation>

Figure 12:
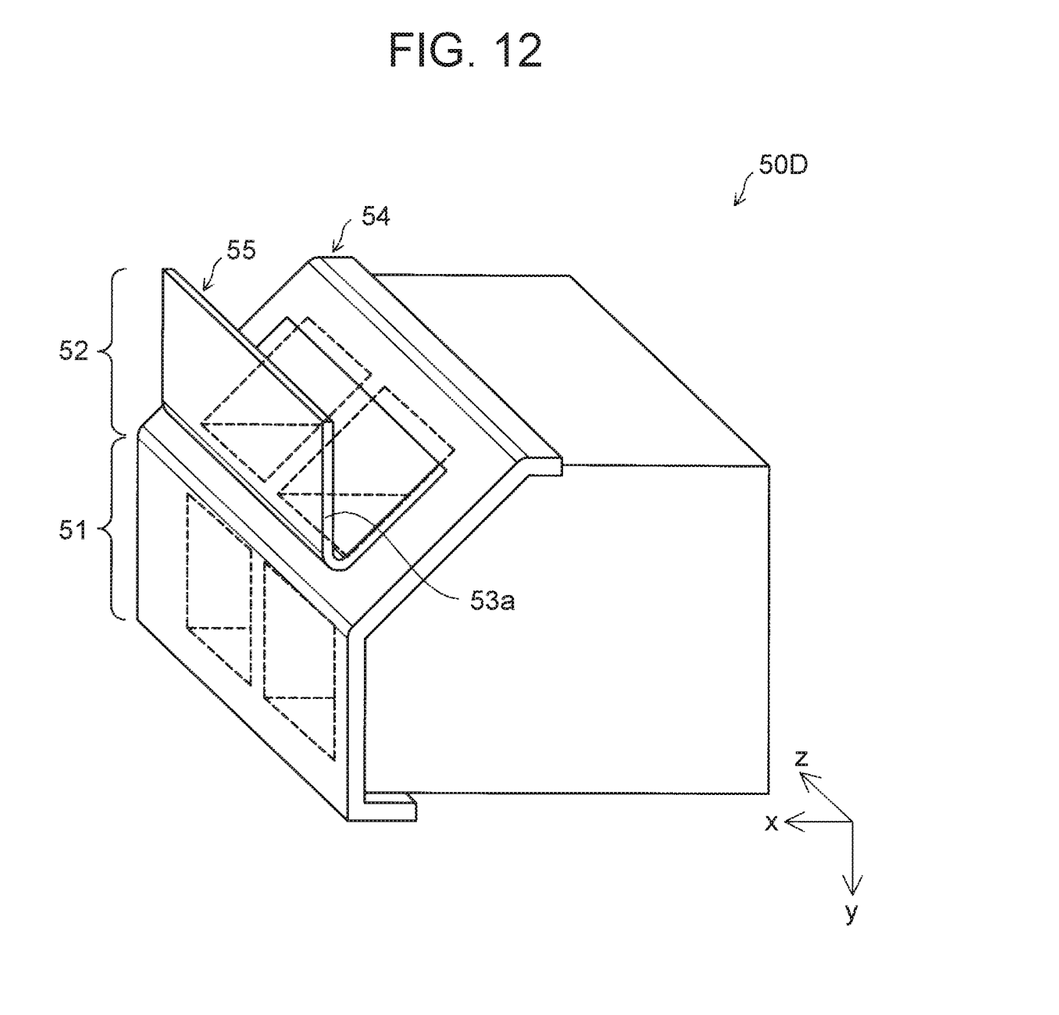
FIG. 12 is an explanatory view showing a schematic configuration of a buffer member in a fifth variation.

FIG. 12 is an explanatory view showing a schematic configuration of a buffer member 50D in the fifth variation. The buffer member 50B in the third embodiment shown in FIG. 9 includes the front cover 53, and the front cover 53 includes the plate-like portion 53a extending upward from the upper end of the front end surface of the first buffer portion 51. On the contrary, as shown in FIG. 12, the plate-like portion 53a may be composed by a plate-like member 55 that is a different member from a front cover 54.

<Sixth Variation>

Figure 13:
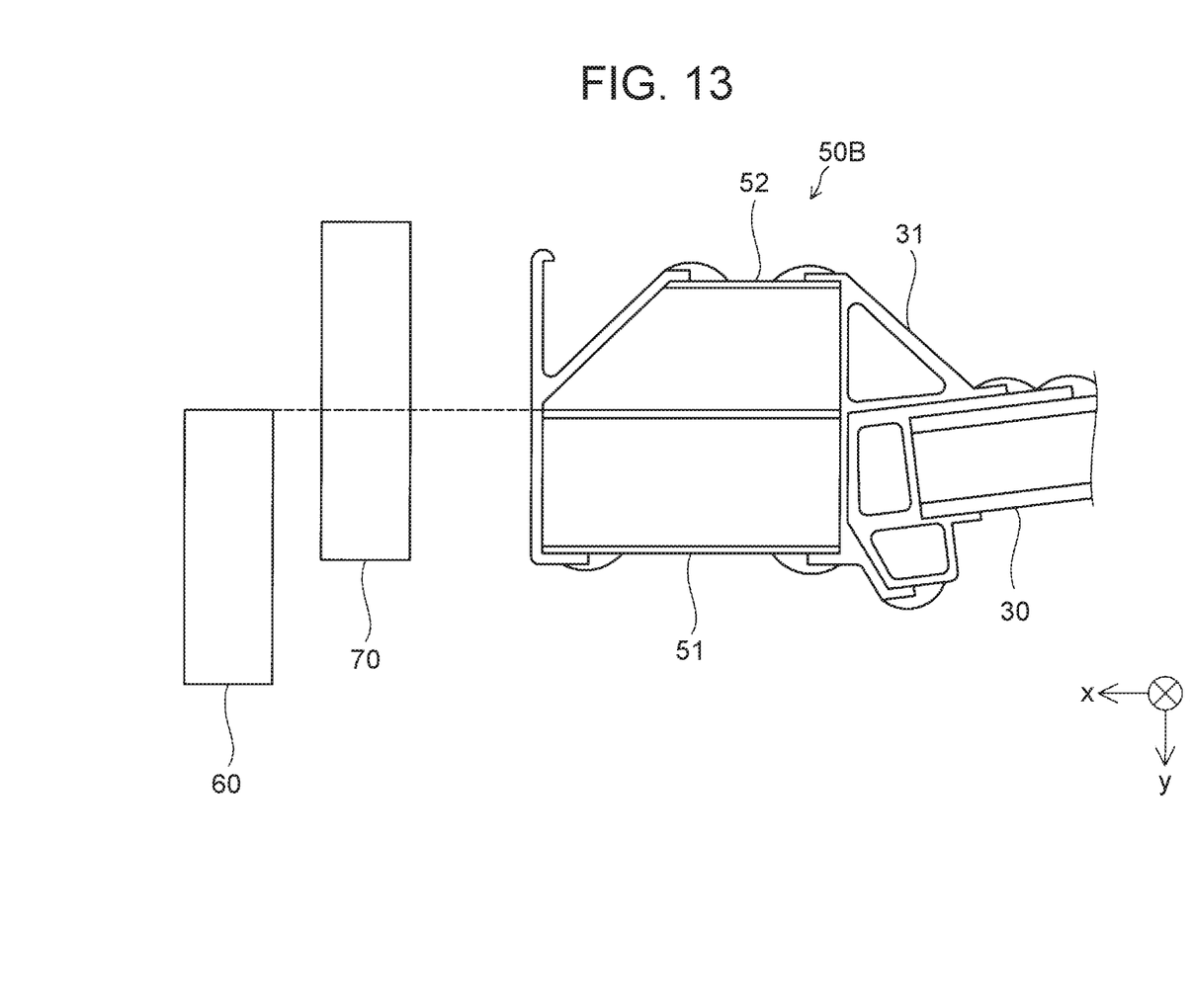
FIG. 13 is an explanatory view showing an arrangement of a buffer member in a sixth variation.

FIG. 13 is an explanatory view showing an arrangement of the buffer member 50B in the sixth variation. In the above second embodiment and the above third embodiment, as shown in FIG. 13, the first buffer portion 51 may be fixed to the front end of the stack frame 30, and the second buffer portion 52 may be fixed to the support member 31 protruding upward from the stack frame 30. If the first buffer portion 51 and the second buffer portion 52 are disposed adjacent to each other in the width direction (the z-axis direction) of the fuel cell vehicle 100A, the support member 31 may protrude in the width direction from the stack frame 30.

<Seventh Variation>

In the first and the second embodiments, each of the buffer members 50, 50A may also be fixed to the stack frame 30 having the support member 31 shown in FIG. 10 and FIG. 13.

The present disclosure is not limited to any of the above embodiments and the above variations, but can be embodied by various configurations without departing from the scope of the spirit. For example, the technical features in the embodiments and variations corresponding to the technical features in the respective aspects described in "Summary" may be replaced or combined appropriately, in order to solve the above-described problems or in order to achieve part or all of the above-described advantageous effects. Any of the technical features may be omitted appropriately unless the technical features are described as essential in the present specification.

What is claimed is:

1. A vehicle comprising:
a front room disposed at a front part of the vehicle in a longitudinal direction of the vehicle;
a fuel cell stack disposed in the front room, the fuel cell stack including multiple cells stacked in the longitudinal direction;
a bumper reinforcement disposed at a front part of the front room in the longitudinal direction;
a buffer member disposed within a range between a front end of the fuel cell stack and the bumper reinforcement in the longitudinal direction; and
an auxiliary-device component disposed between the bumper reinforcement and the buffer member, wherein
at least a part of the buffer member overlaps with the bumper reinforcement, as viewed from a direction along the longitudinal direction,
the buffer member includes a first buffer portion and a second buffer portion, the second buffer portion having a lower durable load in the longitudinal direction than a durable load of the first buffer portion in the longitudinal direction,
the first buffer portion and the second buffer portion are arranged adjacent to each other, and
the first buffer portion is disposed within a range corresponding to an outline of the bumper reinforcement, as viewed from the direction along the longitudinal direction.

2. The vehicle according to claim 1, wherein
the first buffer portion and the second buffer portion are arranged adjacent to each other in a height direction of the vehicle.

3. The vehicle according to claim 1, wherein
at least a part of the second buffer portion overlaps with the auxiliary-device component, as viewed from the direction along the longitudinal direction.

4. The vehicle according to claim 1, wherein
the auxiliary-device component has a higher durable load in the longitudinal direction than a durable load of the bumper reinforcement in the longitudinal direction.

5. The vehicle according to claim 1, wherein
the fuel cell stack includes a stack frame supporting the fuel cell stack,
a part of the buffer member is fixed to the stack frame, and
another part of the buffer member that is not fixed to the stack frame is fixed to a support member protruding from the stack frame.

6. The vehicle according to claim 5, wherein
the buffer member is configured to have a smaller durable load in the longitudinal direction than a durable load of the stack frame in the longitudinal direction and a durable load of the bumper reinforcement in the longitudinal direction.

7. The vehicle according to claim 1, wherein
at least a part of the buffer member overlaps with the fuel cell stack, as viewed from the direction along the longitudinal direction.

8. A vehicle comprising:
a front room disposed at a front part of the vehicle in a longitudinal direction of the vehicle;
a fuel cell stack disposed in the front room, the fuel cell stack including multiple cells stacked in the longitudinal direction;
a bumper reinforcement disposed at a front part of the front room in the longitudinal direction; and
a buffer member disposed within a range between a front end of the fuel cell stack and the bumper reinforcement in the longitudinal direction, wherein
at least a part of the buffer member overlaps with the bumper reinforcement, as viewed from a direction along the longitudinal direction, and
the buffer member is fixed to the front end of the fuel cell stack.

* * * * *